United States Patent [19]
Fiske

[11] Patent Number: 5,827,340
[45] Date of Patent: Oct. 27, 1998

[54] FILTER KIT FOR ELECTRONIC EQUIPMENT

[76] Inventor: Ricardo J. Fiske, 101 S. Spruce St., Unit 205, Escondido, Calif. 92025

[21] Appl. No.: 784,075

[22] Filed: Jan. 17, 1997

[51] Int. Cl.$^6$ .................................................. B01D 46/10
[52] U.S. Cl. ............................ 55/385.6; 55/483; 55/496; 55/500; 55/DIG. 31
[58] Field of Search ............................... 55/385.1, 385.6, 55/482, 483, 493, 496, DIG. 31, 500

[56] References Cited

U.S. PATENT DOCUMENTS

| | | | |
|---|---|---|---|
| 3,853,510 | 12/1974 | Meyer et al. | 55/500 |
| 4,749,390 | 6/1988 | Burnett et al. | 55/DIG. 31 |
| 4,889,542 | 12/1989 | Hayes | 55/97 |
| 4,902,306 | 2/1990 | Burnett et al. | 55/DIG. 31 |
| 5,059,218 | 10/1991 | Pick | 55/DIG. 31 |
| 5,087,276 | 2/1992 | Snyder | 55/496 |
| 5,145,500 | 9/1992 | Nolen, Jr. | 55/DIG. 31 |
| 5,188,646 | 2/1993 | Nolen, Jr. | 55/DIG. 31 |
| 5,312,467 | 5/1994 | Wolfe | 55/493 |
| 5,462,569 | 10/1995 | Benjamin | 55/DIG. 31 |
| 5,525,136 | 6/1996 | Rosen | 55/DIG. 31 |

*Primary Examiner*—Jay H. Woo
*Assistant Examiner*—Minh-Chau T. Pham
*Attorney, Agent, or Firm*—John R. Ross; John R. Ross, III

[57] ABSTRACT

A filter kit for electronic equipment such as personal computers and stereo amplifiers. The kit includes frame material having a total length of at least two feet, a generally "U" shaped cross section and a width of less than 1½ inches, at least one square foot of air filter material and material for attaching a frame made from the frame material around the air intake of the electronic equipment. In a preferred embodiment, the filter kit contains rubbery vinyl gasket material, filter material and double-sided tape. A filter frame large enough so that it fits around the air intake to the electronic device is made from the gasket material. The frame is then attached to the electronic device with double-sided tape or it may be glued in place. Finally, the filter material is inserted inside the frame. The rubbery nature of the frame permits filter replacement (even stiff filters) without removal of the frame from the electronic device. When the electronic device is placed in operation and air is drawn through the air intake, the filter captures airborne impurities.

11 Claims, 3 Drawing Sheets

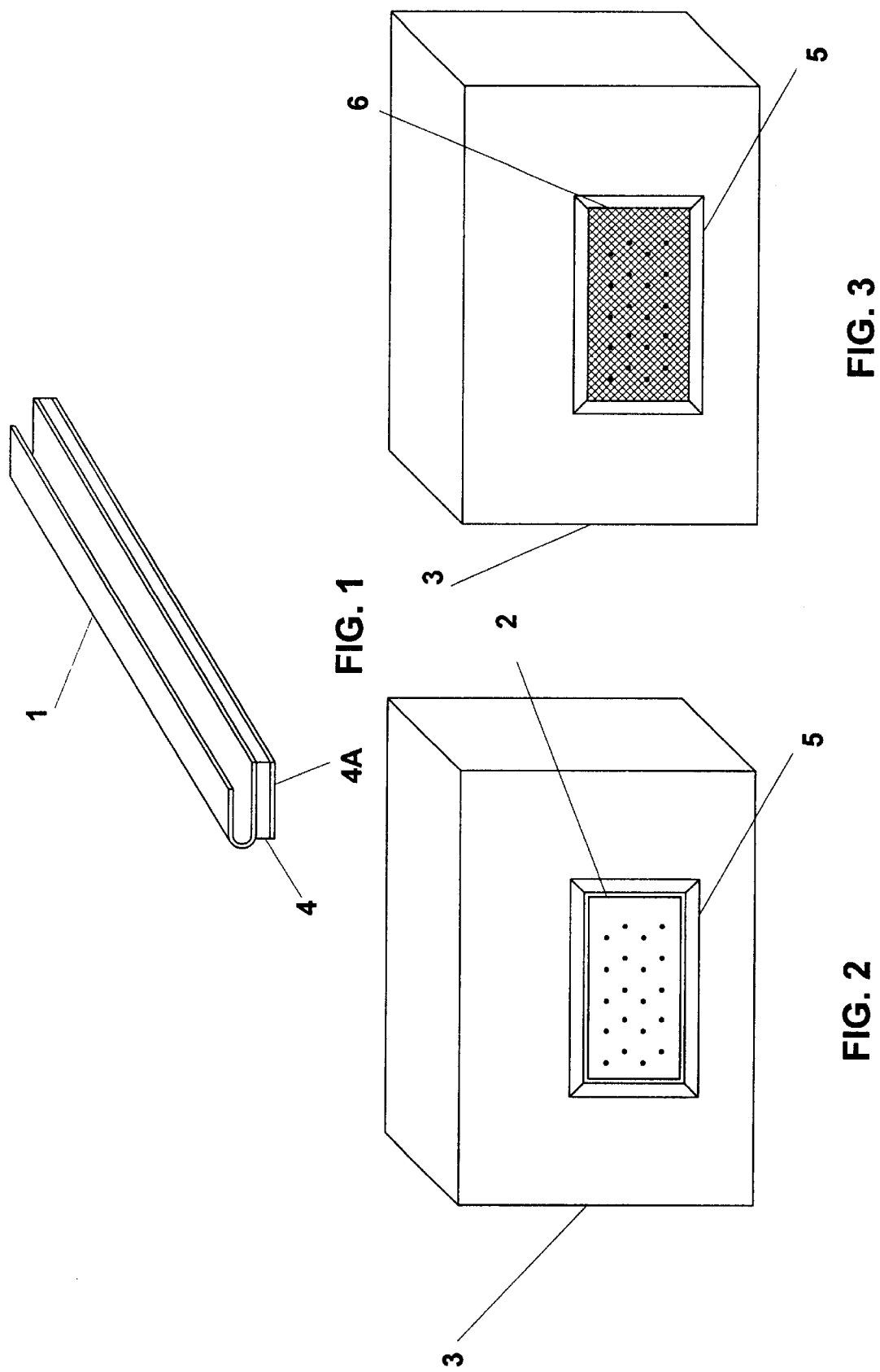

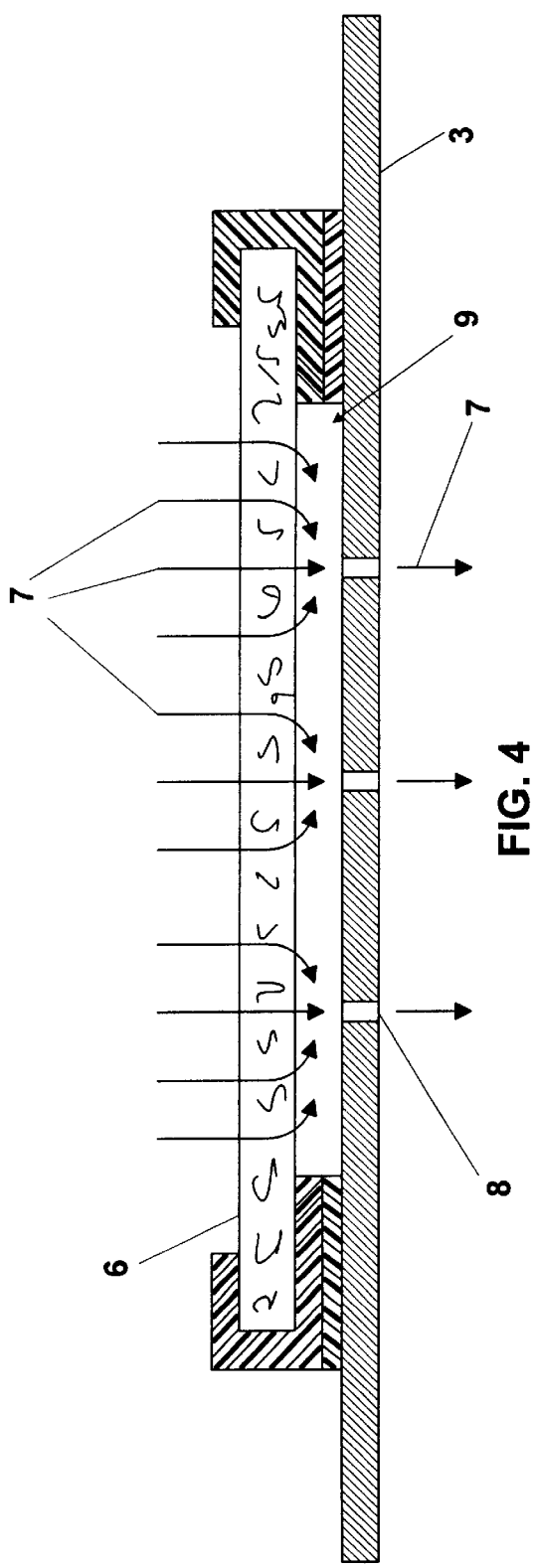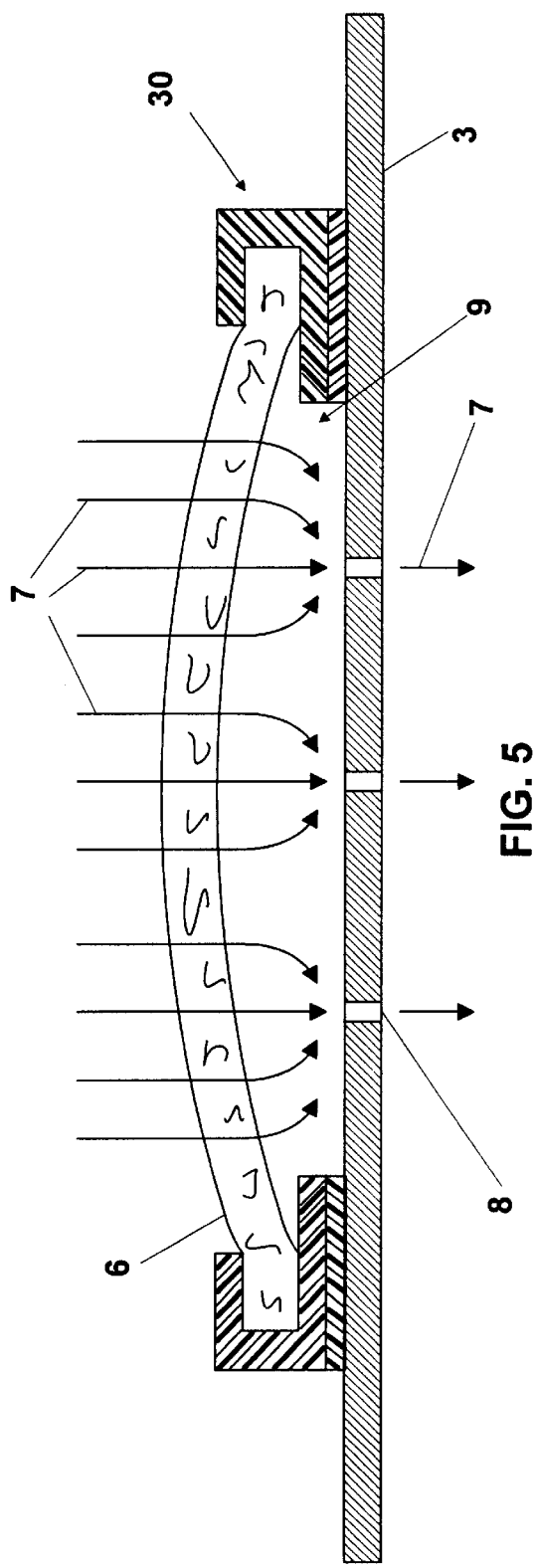

FILTER KIT FOR ELECTRONIC EQUIPMENT

This invention relates to filters for electronic equipment and in particular to filters for after-market electronic equipment.

BACKGROUND OF THE INVENTION

Modern electronic equipment, such as personal computers and many stereo amplifiers, require a flow of cool air over the electronics so that they do not overheat. Typically, the cooling air is directed over the electronics by the operation of a fan which is installed inside the electronic device to suck air out of a housing containing the electronics. The air inlet configurations of equipment vary widely. A typical configuration would be about fifty 1/16 inch diameter holes spaced over an area of about 9 square inches on the side or top of the housing. Unfortunately, however, in addition to directing cool air over the electronics, impurities (such as dust particles) in the air (if not filtered out) are also directed over the electronics.

A large percentage of electronic equipment sold to the general public are not provided with filters. In many very clean environments filters are not needed. However, in other environments impurities in the air can collect on and remain attached to the electronics in such quantities as to cause overheating or failure of part of the electronic device.

What is needed is a filter which can be tailored to fit various sizes of ventilation air intakes.

SUMMARY OF THE INVENTION

The present invention provides a filter kit for electronic equipment such as personal computers and stereo amplifiers. The kit includes frame material having a total length of at least two feet, a generally "U" shaped cross section and a width of less than 1½ inches, at least one square foot of air filter material and material for attaching a frame made from the frame material around the air intake of the electronic equipment. In a preferred embodiment, the filter kit contains rubbery vinyl gasket material, filter material and double-sided tape. A filter frame large enough so that it fits around the air intake to the electronic device is made from the gasket material. The frame is then attached to the electronic device with double-sided tape or it may be glued in place. Finally, the filter material is inserted inside the frame. The rubbery nature of the frame permits filter replacement (even stiff filters) without removal of the frame from the electronic device. When the electronic device is placed in operation and air is drawn through the air intake, the filter captures airborne impurities.

BRIEF DESCRIPTION OF THE PREFERRED EMBODIMENTS

FIG. 1 is a drawing of flexible gasket material with double-sided tape attached to it.

FIG. 2 is a drawing of a gasket frame fitted over the air intake to the electronic device.

FIG. 3 is a drawing showing filter material installed inside the gasket frame.

FIG. 4 is a drawing showing air flowing through the filter.

FIG. 5 is a drawing showing air flowing through a filter with an exaggerated plenum.

DETAILED DESCRIPTION OF THE PREFERRED EMBODIMENT

First Preferred Filter Kit

Figures 6, 7, 8:
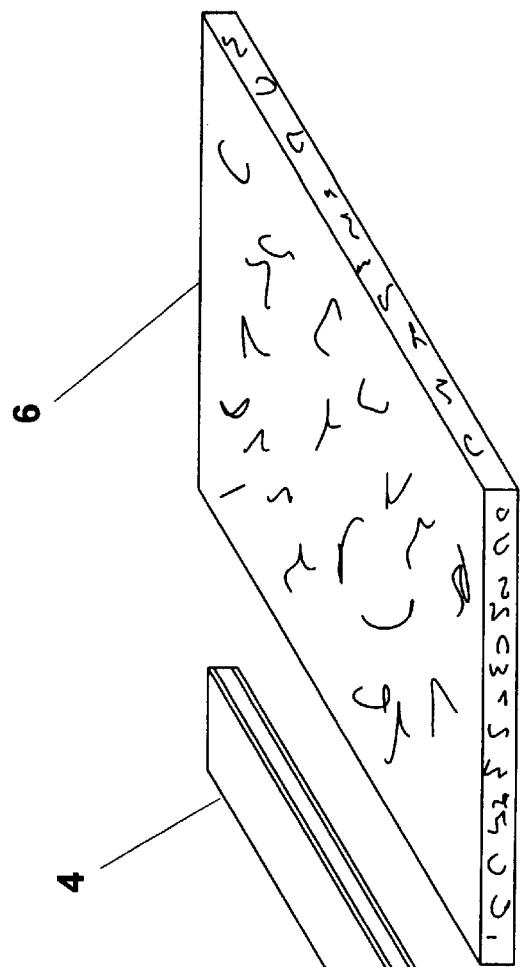
FIG. 6, 7 and 8 show the items that are provided in a preferred filter kit.

A first preferred embodiment of the present invention is a filter kit containing the following items:

1) Four two-foot lengths of rubbery one-inch wide vinyl gasket material having a "U" shaped cross sectional shape such as that shown at 30 in FIGS. 5 and 6. (In my prototype kits, I used length of gasket part number 6387-14 supplied by Gem Products, Inc. This gasket is available at many appliance parts dealers and is generally sold as refrigerator door gasket material. (To obtain my desired cross section shown in FIGS. 5 and 6, I had to trim off a portion of the gasket using a razor blade.)

2) Eight feet length of double sided tape such as 3M, Scotch Heavy Duty Mounting Tape (Catalog No. 114) generally available and supplied by 3M Corporation with offices in St. Paul, Minn. See FIG. 6.

3) Four 1 square foot sections of air filter material. In my prototype kit I used filter material manufactured by Dayton Manufacturing Company with offices in Chicago, Ill. (Pore size 30 pores per square inch. UL Classified, Class 2 (R13458). Air Handler Brand.) The filter material is sold exclusively by the Granger Catalog Company. A section of this filter material is shown in FIG. 7.

With a filter kit containing the above materials, and a pair of scissors, equipment filters can be fabricated in a few minutes which are suitable for filtering cooling air for the large majority of electronic components sold to the general public.

For a very small additional cost, the filter kit could include a razor blade and a 45 degree templet so purchasers would need no tools at all for fabricating and installing the filter.

Fabricating Equipment Filters

As an example, the above kit can be used to fabricate an equipment filter for a personal computer. In one example, intake 2 of a computer measures about 4 inches×6 inches and contains 20 holes. The holes are circular and are ⅛ inch in diameter. To adequately cover this size ventilation intake, the one-inch wide gasket 1 should be cut at a 45 degree angle so that the inside edge of two of gasket's 2 sides measures 4½ inches with corresponding outside edge measuring about 6½ inches. The other two sides should also be cut at 45 degrees with inside edges that measure about 6½ inches with corresponding outside edges of about 8½ inches. Sections of the two-sided tape should be cut to fit the four gasket strips. Protective paper of one side of the sections of tape should be peeled off and the tape stuck to the gasket strips. Before the frame made from gasket 1 is permanently attached to computer 1, it should be tested to make sure it fits properly over intake 2. The open edge of the "U" shaped channel of gasket 1 should face towards the inside of the rectangular frame. Once satisfied that gasket 1 properly fits around intake 2, protective paper 4A should be peeled off of tape 4 and all four sections of gasket 1 pressed to computer 3 for a permanent fit to form gasket frame 5, as shown in FIG. 2.

A section of filter material 6 should then be cut so that it is ⅛ inch less in height and width than the height and width of the outside of the gasket frame 5. In our example, the outside edges of gasket frame 5 form a rectangular shape that measures 6½ inches×8½ inches. Therefore, filter material 6 should be cut to form a rectangular shape that measures 6⅜ inches×8⅜ inches. Filter material 6 is placed in the center of frame 5 and its ends are gently tucked under the upper flap of the 'U' shaped channel of frame 5. After filter material 6 is inserted in frame 5, it will appear as shown in FIG. 3.

Electronic Equipment Filter in Operation

A cross-sectional side view of the first embodiment is shown in FIG. 4. An intake fan that is inside of the electronic device draws air 7 through filter 6 and then through holes 8 that are drilled in the outside wall 3 of the housing of the electronic device. Airborne impurities that are present in air 7 are trapped by filter 6 and are prevented from entering the electronic device. Preferably a plenum 9 is provided in between filter 6 and outside wall 3 so that air flowing through the entire cross sectional area of filter 6 can reach holes 8.

Plenum 9 can be exaggerated, as shown in FIG. 5. The purpose of a larger plenum 9 is to reduce the tendency of dust to preferentially collect on sections of filter 6 directly facing holes 8. The larger plenum 9 is created by enlarging the size of filter 6 so that the filter bulges out in the middle. For a gasket frame 5 that measures 6½ inches×8½ inches on its outside edge, filter 6 could, for example, measure 6½ inches×8½ inches.

Filter material 6 can be removed for cleaning and replaced as necessary.

Other Embodiments

Many variations to the above kit will be obvious based on the above description. The preferred rubbery gasket material described above is very flexible so that one edge of the "U" shaped cross section can be lifted up with finger force to permit stiff filter material to be easily inserted into and removed from the frame made from the gasket material. However, when using flexible filter material it is not necessary that the frame be comprised of flexible material. Any frame having a "U" shape similar to that described in the drawings could be used. For example, a frame could be made of sections of trim lock supplied by Trim Lock, Inc. (with offices in Buena Vista, Calif.) and available from retailers such as Riddout Plastics in San Diego, Calif. This frame is stiff and the filter material must be forced into the frame. This can be done, however, with a device such as a table knife. The frame material should not be wider than 1½ inches and at least two feet of it should be included.

The frame material could be pre-cut into lengths such as 2 inches, 4 inches, 6 inches, 8 inches and 10 inches, with the ends cut at 45 degree angles as shown in FIGS. 2 and 3. Many other filter materials can be also included in the kit. At least one square foot of it should be provided. Preferable the material should be easy to cut, it should provide minimal resistance to air flow and it should be good at collecting dust. Most filter materials suitable for home furnace filter systems would work. One such filter material is Hog-Hair Fiber Air Filter supplied by Eco Air Products Inc with offices in San Diego, Calif. This filter material provides minimal resistance to air flow and has very good dust collecting properties. When kits are provided with pre-cut frame sections, pre-cut filter pieces could also be provided, such as 1⅞ inches by 1⅞ inches, 3⅞ inches by 3⅞ inches, 3⅞ inches by 5⅞, and 7⅞ inches by 9⅞ inches.

Obviously, the frame can be attached to the electronic equipment in many ways other than with the use of two-sided tape. Therefore, the kit could include other types of tapes or various types of glue. When the electronic component has a iron based metal housing, magnetic tape could be used.

Although I developed, through much experimentation, the rubbery frame shown in FIGS. 2 and 3 specifically for the purpose of holding rigid or flexible filter material over the air intake of electronic components, I have since discovered that the material makes a useful frame for many other types of framing applications. These frames are especially useful where the objects being placed in the frame needs to be replaced periodically. The flexible flap (the front of the "U" shaped cross section) can be pulled up to permit, for example, a stiff photograph to be inserted in the frame. Thus, for example, the frame would be useful for framing calendars or daily or weekly schedules.

The above description has been presented for illustration only and is not intended to limit the scope of the invention; accordingly, the scope of the invention should cover all changes and modification that fall within the true spirit and scope of the invention. This scope an spirit should be determined by the appended claims.

I claim:

1. A filter kit for after—market electronic equipment comprising:
    A) a flexible rubbery frame material having a total length of at least two feet, having a generally "U shaped cross section and a width of less than 1½ inches,
    B) at least one square foot of air filter material, and
    C) attachment means for attaching a frame made of said frame material around an air intake of one said after market electronic equipment, wherein said flexible rubbery frame material is flexible enough so that when formed into a frame and attached to said electronic equipment, said frame will permit replacement of said air filter material without removal of said flexible rubbery frame material from said electronic device.

2. A filter kit as in claim 1, wherein said frame material is made from a modified refrigerator gasket.

3. A filter kits as in claim 1, wherein said frame material is vinyl.

4. A filter kit as in claim 1, wherein said air filter material is flexible.

5. A filter kit as in claim 1, wherein said filter is non-flexible.

6. A filter kit as in claim 1, wherein said attachment means is double-sided tape.

7. A filter kit as in claim 1, wherein said attachment means is magnetic tape.

8. A filter kit as in claim 1, wherein said attachment means is glue.

9. A filter kit as in claim 1, wherein the frame material is comprised of a plurality of matching pairs of strips, the two strips of each pair having the same length, with each strip being cut at 45 degrees at both ends.

10. A filter kit as in claim 1, and further comprising a cutting device and a 45 degree templet.

11. A filter kit as in claim 10, wherein said cutting device is a razor blade.

* * * * *